United States Patent [19]

Garbe et al.

[11] Patent Number: 4,475,115

[45] Date of Patent: Oct. 2, 1984

[54] BANDING-FREE PRINTING BY LINEAR ARRAY OF PHOTOSOURCES

[75] Inventors: William F. Garbe, Rochester; Ronald R. Firth, Fairport, both of N.Y.

[73] Assignee: Eastman Kodak Company, Rochester, N.Y.

[21] Appl. No.: 382,739

[22] Filed: May 27, 1982

[51] Int. Cl.³ ....................... G01D 9/42; H04L 15/30; G03B 15/00

[52] U.S. Cl. ....................................... 346/108; 178/90; 354/7

[58] Field of Search .................. 346/108, 107; 178/90; 354/7

[56] References Cited

U.S. PATENT DOCUMENTS

| | | | |
|---|---|---|---|
| 2,058,636 | 10/1936 | Schroter | 178/6 |
| 3,328,522 | 6/1967 | Stone | 178/6.7 |
| 3,438,057 | 4/1969 | Neitzel | 346/107 |
| 3,740,570 | 6/1973 | Kaelin et al. | 307/40 |
| 3,803,353 | 4/1974 | Sanderson et al. | 178/7.2 |
| 3,803,631 | 4/1974 | Nucklos et al. | 346/35 |
| 3,828,356 | 8/1974 | Wiers | 346/108 |
| 3,952,311 | 4/1976 | Lapeyre | 354/5 |
| 3,988,742 | 10/1976 | Meier et al. | 346/107 R |
| 4,000,495 | 12/1976 | Pirtle | 354/7 |
| 4,074,318 | 2/1978 | Kapes, Jr. | 358/230 |
| 4,074,319 | 2/1978 | Goldschmidt et al. | 358/230 |
| 4,074,320 | 2/1978 | Kapes, Jr. | 358/230 |
| 4,090,206 | 5/1978 | Pfeifer et al. | 346/107 R |
| 4,096,486 | 6/1978 | Pfeifer et al. | 346/107 R |
| 4,107,687 | 8/1978 | Pfeifer et al. | 346/107 R |
| 4,139,854 | 2/1979 | Walker | 346/76 R |
| 4,167,014 | 9/1979 | Darling et al. | 346/75 |

*Primary Examiner*—George H. Miller, Jr.
*Attorney, Agent, or Firm*—Raymond L. Owens

[57] ABSTRACT

To prevent banding in a flat field exposed—by means of a linear array of photosources—upon a moving photosensitive web, the invention not only provides that the photosources be pulsed in correspondence with the movement of the photosensitive web, but that the lengths of the printing spots which are employed be equal (or approximately so) to the raster line spacing, whereby smear of any one exposure spot will blend into the smear from the next exposure spot to provide a perfectly flat field exposure.

5 Claims, 10 Drawing Figures

BANDING-FREE PRINTING BY LINEAR ARRAY OF PHOTOSOURCES

BACKGROUND OF THE INVENTION

FIELD OF THE INVENTION

This invention relates in general to image producing apparatus and, more particularly, to apparatus for dynamically producing an areawise image (latent or actual) on a continuously moving photosensitive web, such image being formed of a multiplicity of discrete point-like regions.

The invention as well as the prior art will be described with reference to the figures of which FIGS. 1–6 are diagrams useful in describing (1) the prior art, (2) problems therein, and (3) apparatus for practicing the invention;

DESCRIPTION RELATIVE TO THE PRIOR ART

At the current state of the art, there are two general ways to create an image of the type referred to above, viz. by use of flying-spot type apparatus and by use of a linear array of photosources.

With respect to flying-spot type apparatus, typically such apparatus would comprise a laser (or the like) in cooperation with a polygon (or other) scanner. The spot of light from the laser would be imaged onto the scanner, and would be continuously positioned thereby, so as to effect exposure of a moving photosensitive web adapted to receive the scanning laser spot. Laser scanning, while indeed viable, has a major drawback in that it requires a high degree of percision and control of a number of relatively movable parts. Thus, there is incentive to the use of a (stationary) linear array of photosources for image formation.

In a typical linear array of photosources, the photosources thereof—which may for example be light emitting diodes (LED's)—are selectively turned on and off to effect line-by-line exposure of a moving photosensitive web adapted to receive the spots of irradiance associated with the photosources. Because the intensity of the light output of an LED is much less than that of a laser, it is usual to provide that the ON time of any given LED (while exposing a given picture element, i.e. pixel) be comparatively long, thereby to assure that the cooperating photosensitive web is properly exposed.

Each LED photosource is productive of, say, a uniform rectangular printing spot having a size dependent on the dimensions of the output aperture of the LED photosource. While the widthwise dimensions of a spot are not addressed in connection with the invention herein disclosed, printing spot length, and spot smear as influenced by web motion, are indeed of concern.

In a system in which a moving web is exposed by successive pulsings of an LED photosource, a pixel shall be considered to represent the area of the web exposed by a single pulsing of the LED photosource. A pixel thus represents the area of minimum information content in the image. The length of the pixel is equal to the length of the exposing spot plus any smear of the spot due to motion of the web during the exposure time.

A second dimension of concern is the raster line spacing, which is defined as the distance which the web moves during the time interval between the initiation of one exposure pulse and the next, when the web is properly moving at its normal transport velocity.

Figure 1:
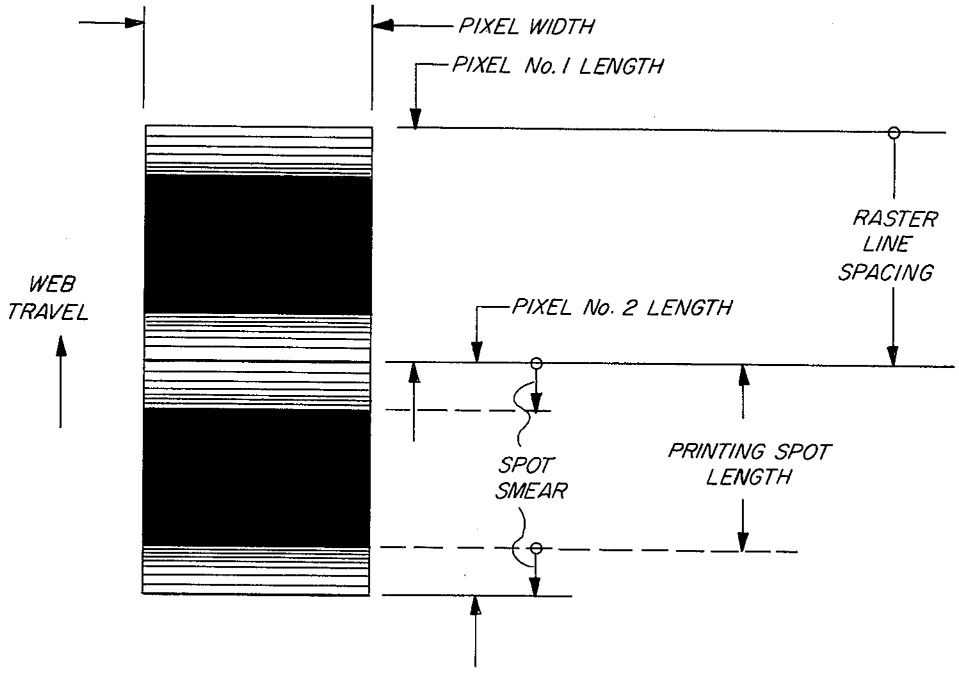

In order to achieve an image having the maximum dynamic range there should be no unexposed regions between pixels; thus pixel length (printing spot length plus smear) should desirably be at least equal to the raster line spacing. On the other hand, in order to achieve the maximum resolution in the image, a pixel should be no longer than the line spacing so as to avoid overlap. Thus it would appear that the optimum LED printer design would use a pixel whose length (printing spot length plus smear) is exactly equal to the raster line spacing. See FIG. 1 which shows part of a row of (square) pixels exposed by successive pulsings of a given LED, there being no unexposed gaps between the pixels, or overlap of pixels.

Figure 3:
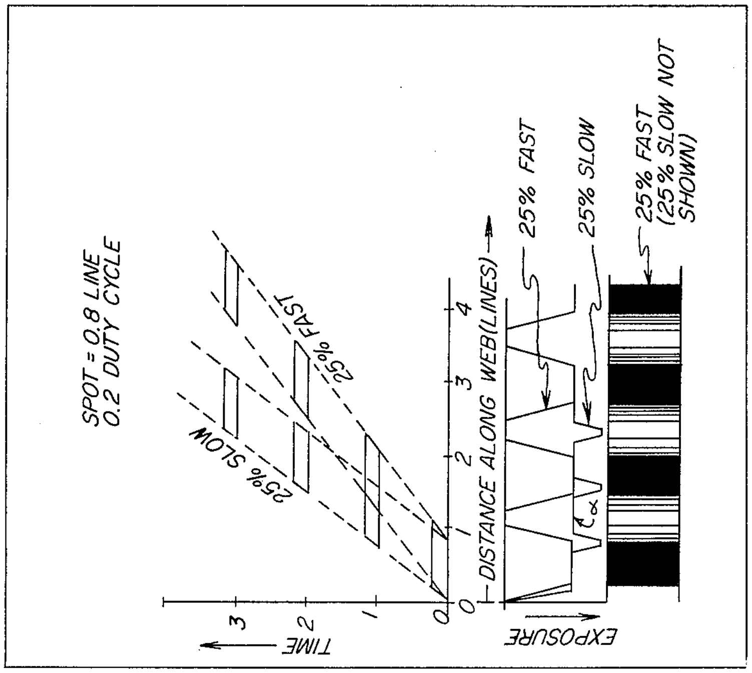
Figure 2:
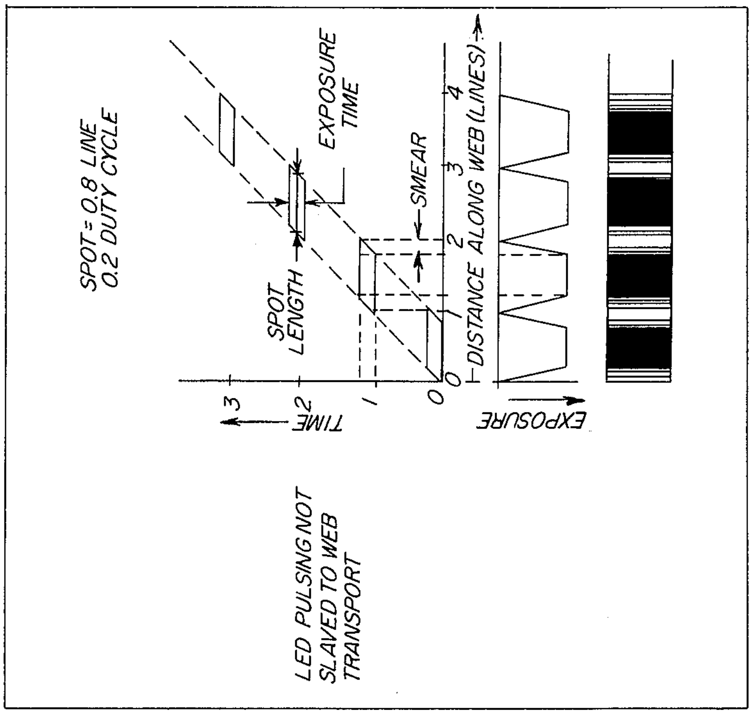

Having produced a system based on the exposure of a moving photosensitive web by means of a linear array of LED's, it became apparent that when such system was employed to expose a flat—i.e. constant density—field in such web, the field undesirably exhibited (at normal viewing distance) considerable banding therewithin. By analysis, it was concluded that flutter within the web transport was the source of the banding problem, whereby periodic speed up and slow down of the moving web caused, respectively, less and more exposure than would otherwise have been desired. See FIGS. 2 and 3 which graphically depict the exposure profile of lines exposed on a photosensitive web by means of an LED array. FIG. 2 indicates the situation where the web transport is operating at its nominal speed in the absence of flutter. Note that each line receives a uniform core exposure and a gradient exposure at each edge. FIG. 3 represents the situation which occurs at the maximum and minimum speeds of a system having a ±25% velocity fluctuation (conventionally expressed at 50% peak-to-peak flutter). Note the occurrence of gaps and overlaps between the lines. When the LED array in question operates with a web transport having such flutter, the exposure profile varies in a continuous fashion among the three cases shown in FIGS. 2 and 3. Such continuously varying exposure profile results in a visible and highly objectionable variation in image density in a supposedly flat field (i.e. banding).

To reconcile the banding problem, without having to go to the considerable expense of building perfection into the photosensitive web transport system, the pulsing of the LED array was slaved to the drive of the photosensitive web. Such a synchronizing technique assured that the line spacing of the exposed pixels was constant . . . and, it was assumed, this would mean that the banding problem would vanish. But, still some banding remained . . . and in some cases the banding worsened.

Figure 4:
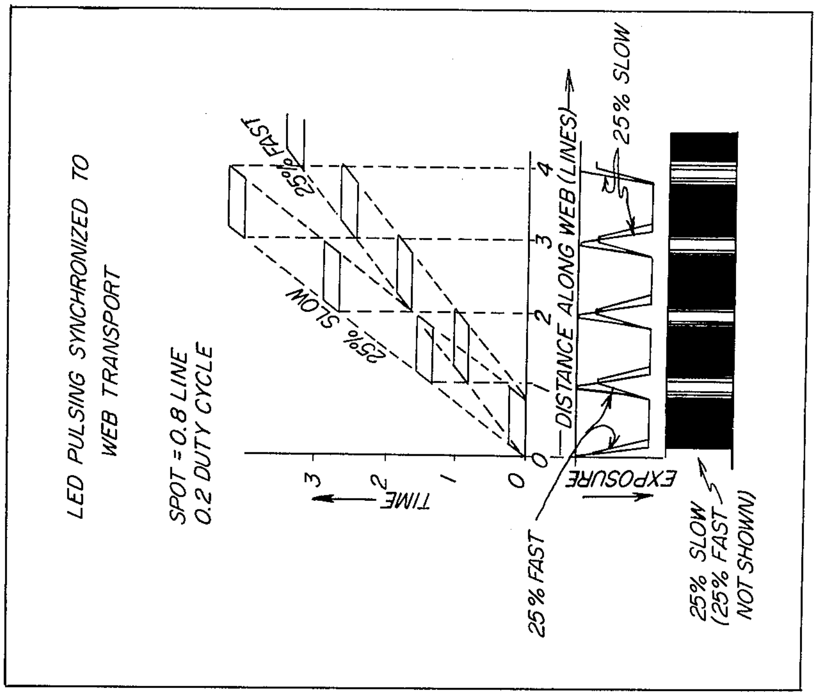

To appreciate the source of the residual banding, reference should be had to FIG. 4 which shows (for the case where the LED pusles are synchronized to the web transport) two different exposure profiles for the 25% fast and 25% slow transport velocity error conditions. Bearing in mind that the fluttering web transport in question passes through the desired nominal web speed while going from 25% fast to 25% slow, note that for the 25% slow condition the gradient due to smear at the leading and trailing edges of the spot is slightly shorter and steeper than at the nominal speed and that there is a slight "no-exposure" gap between the exposed lines. For the 25% fast condition, on the other hand, a longer and less steep gradient than for the nominal speed occurs, giving rise to an overlap of the exposed lines. Such a continually varying exposure profile, as above, manifests itself (depending on the transfer function of the photosensitive material in question) as objectionable visible banding in an exposure field that is supposed to be flat. (Admittedly, an apparent solution to the residual banding problem would be to employ very brief exposure durations, whereby the effect of differing rise times for the fast and slow exposure profiles would be negligible. But such a technique is not viable because of the aforesaid need to employ sufficiently long exposures to effect actinic exposure of the moving web.)

SUMMARY OF THE INVENTION

To prevent banding in a flat field exposed—by means of a linear array of photosources—upon a moving photosensitive web, the invention not only provides that the photosources be pulsed in correspondence with the movement of the photosensitive web, but that the lengths of the printing spots which are employed be equal (or approximately so) to the raster line spacing (or multiples thereof), whereby smear of any one exposure spot will blend into the smear from the next exposure spot to provide a perfectly flat field exposure. That this is so may be appreciated from FIG. 5.

Figure 5:
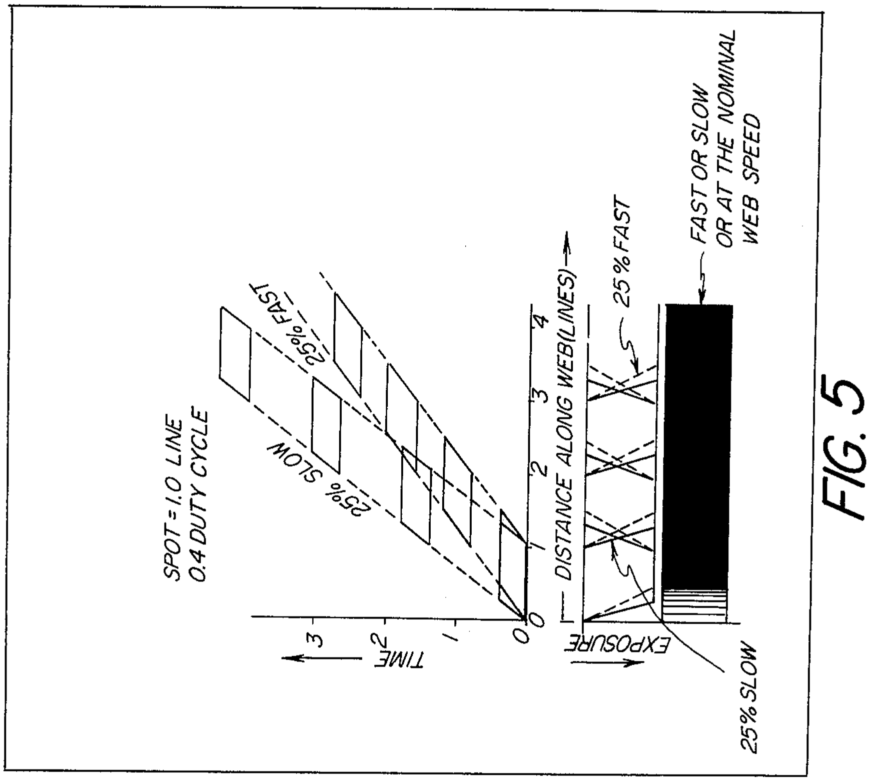

Referring therefore to FIG. 5, it is evident that, in a "synced" system, spot smear associated with the exposure of one line is complemented by the spot smear associated with the next line . . . regardless of the instantaneous speed of the photosensitive web . . . and, attendantly, this precludes objectionable banding.

Figure 6:
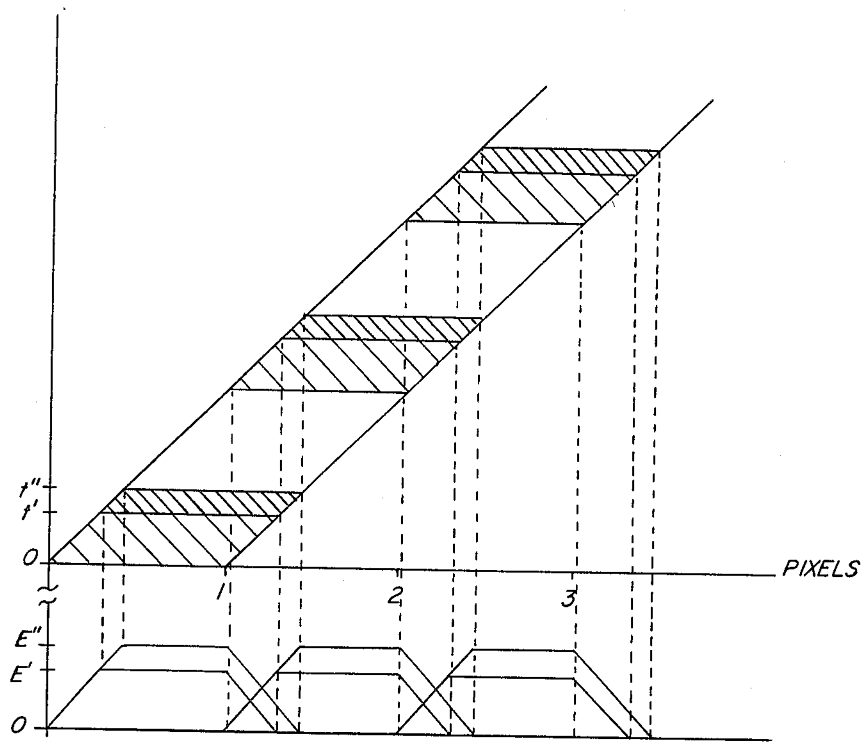

Implicit in any image producing system for which there is concern about the quality of exposed flat fields is the need therein to provide flat fields of differing densities as will occur in so-called continuous tone images. To this end, and as will be appreciated below, flat fields of differing densities are effected by selectively varying the widths of the pulses which are applied to the LED's. For one exposure density, the pulse width duration is of one amount; for a different exposure density, the pulse width duration is of a different amount; etc. The above-described concept of correlating printing spot length with raster line spacing is compatible with the practice of varying pulse width duration to effect differing flat field densities as will be appreciated from a review of FIG. 6. Note that for a printing spot size that equals the raster line spacing, the exposure will be flat for each given exposure duration. For an exposure duration t′, the exposure is a flat E′; for an exposure duration t″, the exposure is a flat E″, etc.

DESCRIPTION OF APPARATUS FOR PRACTICING THE INVENTION

Figure 7:
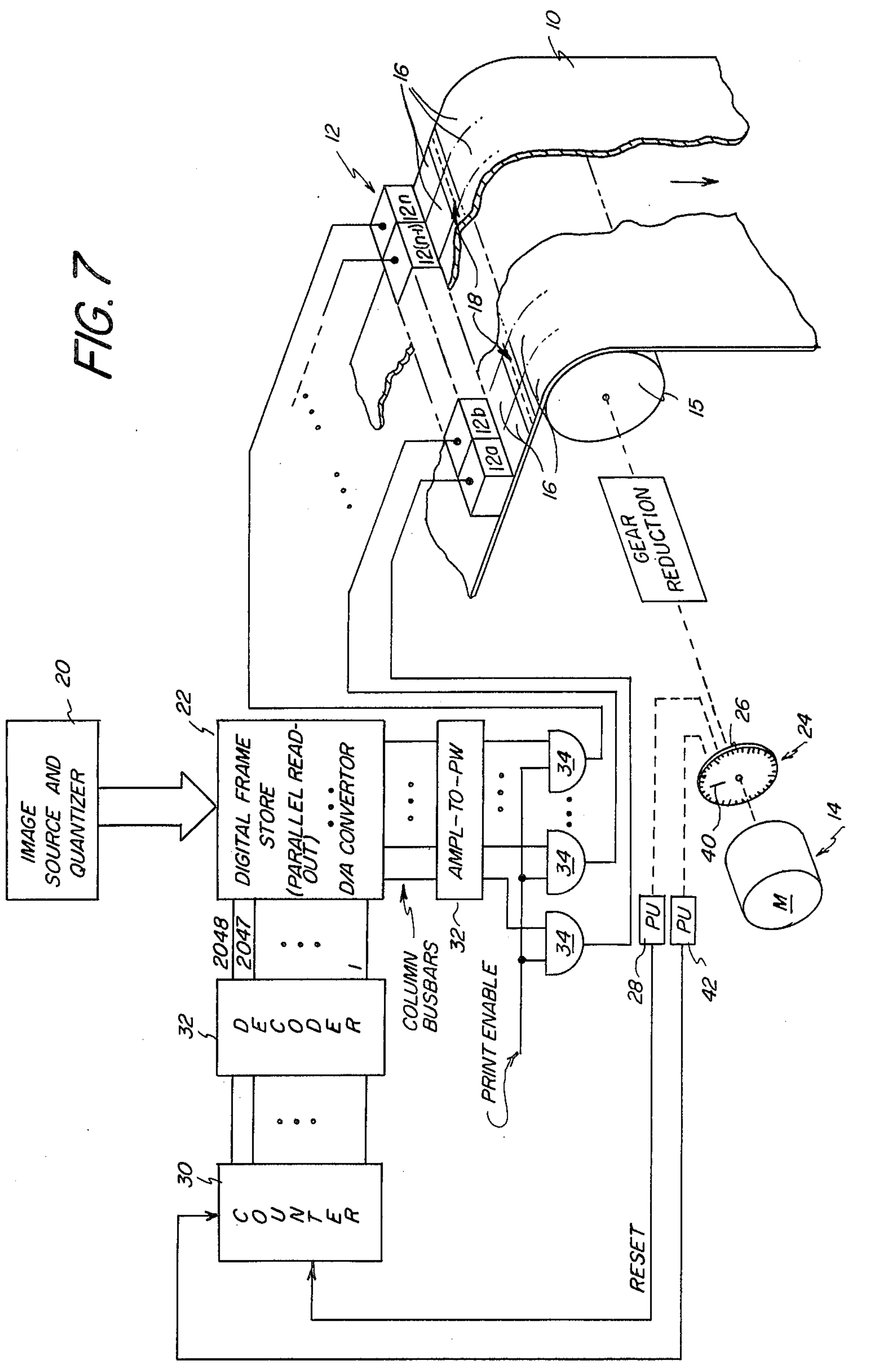
FIG. 7 is a schematic block diagram of apparatus embodying the invention.

Referring to FIG. 7, a photosensitive web 10 is adapted to be driven continuously past an array 12 of LED photosources 12*a*, 12*b* . . . 12*n* by means of a motor 14. As depicted, the array 12 is upstream of a roller 15 driven by the motor. Such a showing has been presented for ease of understanding; but, it will be appreciated, to minimize the effects of web flutter at the array 12, such array is preferably situated in proximity to the roller 15. Typically, the array 12 would comprise about 3000 or more LED's and the web 10 would be about 11 inches wide. In one embodiment of the invention the web 10 may be a photographically positive-working material as might be employed in xerographic-type apparatus . . . charge transfer, toning and other xerographic techniques not forming part of this invention; and in another embodiment the web 10 may be a photographically negative-working material for production, say, of a photographic negative from which positive prints might be made; etc. Clearly then, the specific nature of the photosensitive web will depend on the application to which the invention is put.

As the web 10 is advanced, the LED's in the array 12 thereof are selectively turned on and off to expose lines 16 in the web 10. No attempt has been made in FIG. 7 to indicate the degree of exposure effected by means of the LED's, although the exposure spots are graphically shown to comprise respective printing spots plus smear 18.

Image signals corresponding to the desired exposure of pixels in the web 10 may be derived from a variety of sources, e.g. (TV signals on) magnetic tape; (signals produced by scanning) a hard copy of an image, etc. Whatever may be the image signal source 20, however, source signals are placed in suitable form, quantized, and then applied to a frame store device 22 . . . and all such signal processing is well within the skill of those in the art.

To assure that the line spacing is uniform despite flutter in the transport of the web 10, an incremental shaft encoder 24, driven by the motor 14, is employed. Such shaft encoders are well known to those in the art and typically comprise a disk with a suitable number of fiducial marks 26, the number depending on the application in question. As depicted, the frame store 22 is adapted, in this embodiment, to store 2048 lines of pictorial information; thus, the shaft encoder 24 would comprise 2048 fiducial marks 26.

As the web 10 is advanced, the fiducial marks 26 are sensed by means of a signal-producing pickup 28. Such fiducial-dependent signals are applied then to a binary counter 30 which increments in correspondence with the transport of the web 10. A decoder 32 decodes the instantaneous count of the counter 30 and successively applies gating signals to the 2048 row inputs of the frame store 22. Attendantly, columns of signals corresponding to the stored frames are successively gated row-by-row out of the frame store 22 . . . and this occurs in correspondence with the transport of the web 10. Since the frame store 22 stores quantized versions of the signals which constitute the image in question, digital-to-analog (D/A) conversion means is provided.

Each analog "column" signal output has an amplitude corresponding to the desired density (or reflectance as the case may be) associated with its corresponding pixel. Therefore, in accordance with the invention, as indicated above, the signal amplitudes associated with individual pixels are pulse width modulated in a circuit 32. Pulse width modulation, and circuits therefor, are well known to those in the art.

Each pixel signal having a pulse width dependent on its corresponding density (or reflectance) is applied to a respective AND gate 34, an enable signal being continuously applied to such AND gate. Thus, an enable signal is applied, via the AND gates 34, to corresponding LED's in the array 12 for respective durations dependent on the pixel densities to be registered in the web 10.

In the event the transport of the web 10 is subject to flutter, the rate at which the shaft encoder 24 produces "count" signals is correspondingly altered, whereby the line spacing between the lines of pixels in the web 10 is kept uniform.

As the 2048th row of image signals is gated from the frame store 22, a fiducial mark 40, forming part of the shaft encoder 24, is sensed by a signal-producing pickup 42 which applies its output signal to the "reset" input of the counter 30. Thereafter, another image may be quantized and stored in the frame store 22 for a repeat of the above-described process.

Pursuant to the invention, the lengthwise sizes of the rectangular printing spots produced by the LED's in the array 12 are designed to be the same as the raster line spacing, whereby the matter of banding in a "synchronized" exposure system will be eliminated. See FIGS. 5 and 6.

Figure 8:
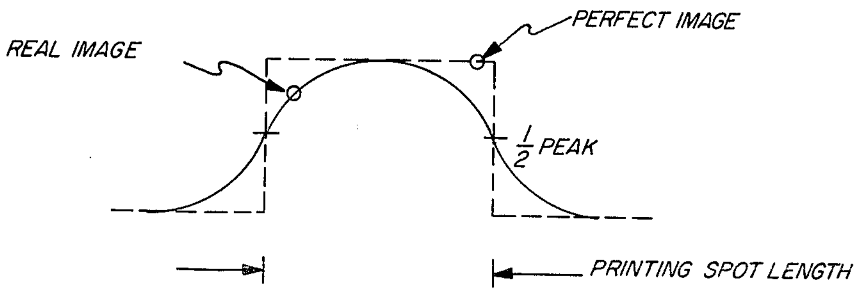
FIG. 8 is a diagram illustrating a qualification that may be adapted in the practice of the invention.

The above analysis has been carried out for printing spots which are both sharply defined and of uniform irradiance . . . conditions which cannot be completely satisfied in actual practice. For example, optical aberrations and diffraction, and even scatter within the photosensitive material, will cause the edges of the exposure spot to be degraded. In the limit a small sharply defined and uniform source may be imaged as a spot having an approximately Gaussian irradiance distribution. In such a case the optical match of printing spot length to line spacing, as taught above, would be impossible; and so the invention further provides that the printing spot length be defined as extending between two parts thereof where the irradiance is about one-half the peak irradiance of the spot. See FIG. 8.

Figure 9:
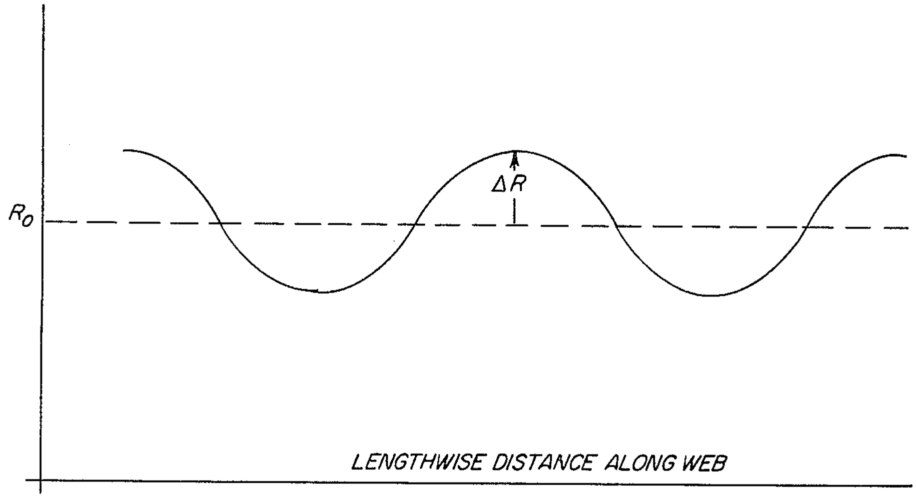
FIGS. 9 and 10 are diagrams illustrating still another qualification that may be adapted in the practice of the invention.

While the complete absence of banding in a flat field is the ideal situation (and is attainable by means of the invention), E. M. Lowry and J. J. DePalma in their treatise *Sine-Wave Response of the Visual System. II. Sine-Wave and Square-Wave Contrast Sensitivity,* Journal of the Optical Society of America, March, 1962, determined that, at normal viewing distance, for say banding in the critical region of 10 cycles per lengthwise inch of the print medium, banding would only be visible if the contrast ratio C thereof was greater than about 0.0028, the contrast ratio C being (for a reflection print) defined as $$C=(\Delta R/R_o) \quad (1)$$

where $R_o$ and $\Delta R$ are, respectively, average print reflectance and maximum reflectance error. See FIG. 9. (In the case of transparency material, the contrast ratio C would equal ($\Delta T/T_o$), where $T_o$ and $\Delta T$ are respectively transmittance and transmittance error.)

Figure 10:
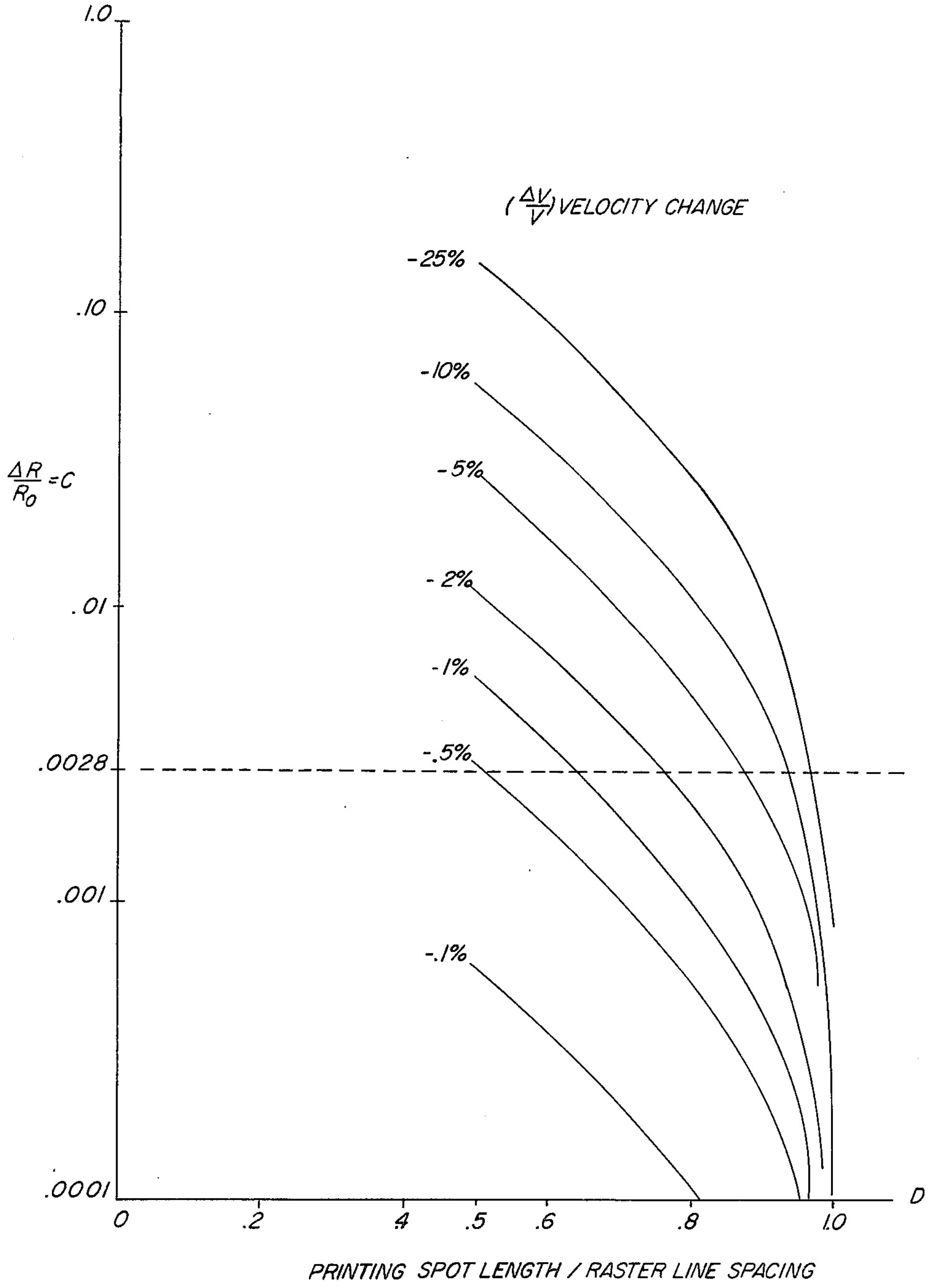

Contrast ratio has been found to depend on both web speed flutter and spot length, and such dependence is indicated by the following empiric equation $$C = \frac{k_1 \frac{\Delta V}{V}}{k_2\left(\frac{2D-1}{1-D}\right) + k_3} \quad (2)$$

where D is the ratio of printing spot length to raster line spacing; $k_1$, $k_2$, and $k_3$ are constants for the photosensitive material in question; and ($\Delta V/V$) corresponds to web speed flutter. FIG. 10 indicates a family of curves, corresponding to equation 2, for a particular print material; and, obviously, other materials—be they positive or negative working—will have different sets of C vs. D curves. What equation 2 (and the curves of FIG. 10) indicates, then, is that some qualification as to the need for the printing spot length and raster line spacing to be equal is possible if "imperceptible" banding can be tolerated. In other words (again referring to FIG. 10), for say a web being printed upon and having as much as 10% flutter, a spot-to-line spacing ratio of $D>$ about 0.9 would be productive of a print having essentially no visible banding, i.e. $C<0.0028$.

The invention has been described in detail with particular reference to preferred embodiments thereof, but it will be understood that variations and modifications can be effected within the spirit and scope of the invention. For example, while rectangularly-shaped spots are ideally suited to the invention, some variations in spot shape may be viable provided that the lengthwise dimensions of such spot shapes are as taught herein. And, while a simple form of spot length modulation is indicated herein, it will be appreciated that more elegant modulation techniques are adaptable by the invention.

What is claimed is:

1. Apparatus for use in exposing a substantially flat image field comprising:
- (a) a linear array of photosources adapted to cast radiant printing spots, of substantially equal size,
- (b) photosensitive means adapted to receive the radiant printing spots cast by said photosources,
- (c) a transport mechanism for moving translationally said photosensitive means relative to said array at a predetermined rate,
- (d) means coupled to said transport mechanism and responsive to the relative movement of said photosensitive means and said array for pulsing the photosources of said array in synchronization with such relative movement, to provide lines of printing spots which are exposed on said photosensitive means and which have a predetermined spacing therebetween, and
- (e) means for controlling the light emitted by said photosources such that it casts printing spots the lengths of which are substantially equal to said line spacing, whereby said lines of printing spots blend together to effect a banding-free flat exposure field.

2. The apparatus of claim 1 including means for modulating the pulse duration of said means for pulsing to vary the extent by which respective pixels within an exposure line are exposed.

3. The apparatus of claim 1 wherein said linear array of photosources is comprised of a plurality of light-emitting diodes.

4. The apparatus of claim 1 wherein said cast spots are rectangularly shaped.

5. The apparatus of claim 4 wherein the exposure line spacing is the same as the lengths of said printing spots.

* * * * *